(12) United States Patent
Shupak et al.

(10) Patent No.: US 7,120,675 B1
(45) Date of Patent: Oct. 10, 2006

(54) INFORMATION LOCATION SERVICE

(75) Inventors: Richard M. Shupak, Bellevue, WA (US); Barbara L. Kess, Redmond, WA (US); Simon M. Meacham, Seattle, WA (US); Pat Styles, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 739 days.

(21) Appl. No.: 09/670,073

(22) Filed: Sep. 26, 2000

(51) Int. Cl.
*G06F 15/16* (2006.01)
*G06F 15/173* (2006.01)
*G06F 9/44* (2006.01)

(52) U.S. Cl. ............. 709/217; 709/223; 709/230; 717/173

(58) Field of Classification Search ......... 709/203, 709/217, 219, 223; 707/10; 717/103, 122, 717/163, 167, 173
See application file for complete search history.

(56) References Cited

U.S. PATENT DOCUMENTS

| | | | | |
|---|---|---|---|---|
| 4,558,413 A | * | 12/1985 | Schmidt et al. | 707/203 |
| 4,714,996 A | * | 12/1987 | Gladney et al. | 707/203 |
| 5,155,847 A | * | 10/1992 | Kirouac et al. | 709/221 |
| 5,649,200 A | * | 7/1997 | Leblang et al. | 717/122 |
| 5,649,204 A | * | 7/1997 | Pickett | 717/167 |
| 5,758,343 A | * | 5/1998 | Vigil et al. | 707/10 |
| 5,793,966 A | * | 8/1998 | Amstein et al. | 709/203 |
| 5,983,267 A | * | 11/1999 | Shklar et al. | 709/217 |
| 5,987,510 A | * | 11/1999 | Imai et al. | 709/219 |
| 6,052,531 A | * | 4/2000 | Waldin et al. | 717/170 |
| 6,085,188 A | * | 7/2000 | Bachmann et al. | 707/3 |
| 6,098,108 A | * | 8/2000 | Sridhar et al. | 709/239 |
| 6,131,120 A | * | 10/2000 | Reid | 709/225 |
| 6,253,239 B1 | * | 6/2001 | Shklar et al. | 709/217 |
| 6,651,249 B1 | * | 11/2003 | Waldin et al. | 717/170 |
| 6,732,358 B1 | * | 5/2004 | Siefert | 717/173 |

OTHER PUBLICATIONS

"The .dbg Files", http://msdn.microsoft.com/library/devprods/vs6/visualc/vccore/_core_the_..dbg._files.htm, pp. 1-2, (Dec. 3, 1999).
"The .pdb Files", http://msdn.microsoft.com/library/devprods/vs6/visualc/vccore/_core_the_..pdb_files.htm, p. 1, (Dec. 3, 1999).

* cited by examiner

*Primary Examiner*—Saleh Najjar
*Assistant Examiner*—Kevin T Bates
(74) *Attorney, Agent, or Firm*—Merchant & Gould P.C.; Ryan T. Grace

(57) ABSTRACT

This present invention extends the mechanism for locating solution access information and then obtaining and implementing the correct solution for updating software programs. The user can communicate with one system on the network, tell it what the user is interested in, and then the system replies on a file by file basis where to locate the desired information. Thus, the user no longer has to register, e.g. in the environment variables, the individual paths for where a multitude of different applications find their additional related information on the network. According to the teachings of the present invention, a user will have to make basically zero changes to the system, and instead will automatically discover the name location of a server that is going to provide the user with the information associated with any user executable file.

In particular, one embodiment of the present invention includes a computer implemented method. The method includes querying a first server for a location of a second server containing information associated with a local file. The method further includes querying the second server for the information associated with the local file. The second server then provides the information associated with the executable. Other systems and methods are included within the scope of the present invention.

47 Claims, 4 Drawing Sheets

INFORMATION LOCATION SERVICE

FIELD OF THE INVENTION

This invention relates generally to information systems and more particularly to methods and systems for locating information associated with an executable file.

COPYRIGHT NOTICE/PERMISSION

A portion of the disclosure of this patent document contains material that is subject to copyright protection. The copyright client has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2000, Microsoft Corporation, All Rights Reserved.

BACKGROUND

While software is being developed and after it is deployed, it is often important to have access to information related to the executable software that is not stored as part of the executable. This includes, but is not limited to, debug information produced by the development tools like compilers and linkers, the source code from which the executable is generated, instructions for tools that process the executable in some way, patches to transform an executable to another version, and the output of tools that get made available for use by other tools.

For groups developing or deploying software, getting access to this information can be difficult or time consuming. Every time the software is updated, the associated information is usually updated and the updates made available. In a development environment, this can be as often as several times a day. Some common mechanisms used to handle this today are to copy the information to the computer where the software is installed and rely on default search mechanisms for tools that need it to find this information, to set environment variables to point to a location on the local computer or a network server where the information resides and to update these environment variables whenever the software is updated, to patch the executable files that comprise the software to point to the location where the information resides, or for tools to assume that the information can be found locally and to prompt the user to enter the correct location when the information cannot be found. All of these require either extra steps to be taken whenever software is updated or for some individual to have knowledge where to find the information that is needed.

For software deployment scenarios in particular, though this can also apply to development and other uses, all the information is not needed all the time so requiring the information to be copied locally is unnecessary. It is also impractical in many cases. For example, for Windows 2000 the symbolic debug information for all the executables is in excess of three gigabytes. It is not necessary to have all this information available all the time just so the fraction that is needed can be available when it is needed.

Updating environment variables every time the software is updated is time consuming and error prone. The more distinct software packages installed, the more effort involved and the greater the likelihood of error.

As new types of information are introduced, any scripts and/or processes to update the client systems to locate information need to be updated to include the new types further increasing the cost of keeping the client system updated.

For the reasons stated above and for other reasons which will become apparent from reading and studying the present disclosure, systems and methods are needed which extend the mechanism for locating solution access information, e.g. information related to an executable, including more accurately pinpointing the solution access information, and then obtaining and implementing the correct solution for updating software programs.

SUMMARY

This present invention extends the mechanism for locating solution access information and then obtaining and implementing the correct solution for updating software programs. The user can communicate with a server, tell it what the user is interested in, and then the server replies on a file by file basis where to locate the desired information. Thus, the user no longer has to register, e.g. in the environment variables, the individual paths for where a multitude of different applications find their additional related information on the network. According to the teachings of the present invention, a user will have to make basically zero changes to the system, and instead will automatically discover the name location of a server that is going to provide the user with the information associated with any user executable file.

In particular, one embodiment of the present invention includes a computer implemented method. The method includes a method for locating information associated with a local file. The method includes packaging metadata extracted from the local file into an HTTP request. The method further includes sending the HTTP request to a set of locator servers containing location information for information associated with the local file. The method further includes receiving a set of information back from the set of locator servers. An HTTP query is then packaged for retrieving the information associated with the local file based on the set of information received back from the set of locator servers.

In another embodiment of the present invention, a server architecture is provided. The architecture includes a first server, or symbol locator server. According to the teachings of the present invention, the first server includes means for interpreting metadata associated with a local file received from a remote client. The first server further includes means for redirecting the remote client to a second server containing information associated with the executable file. The second server is adapted for interpreting a query from the remote client and retrieving a specific file from among the information associated with the local file.

DETAILED DESCRIPTION

In the following detailed description of exemplary embodiments of the invention, reference is made to the accompanying drawings that form a part hereof and, which show by way of illustration, specific exemplary embodiments in which the invention may be practiced. These embodiments are described in sufficient detail to enable those skilled in the art to practice the invention. It is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into three sections. The first section describes the hardware and the operating environment that is suitable for use as a server within the inventive storage system described below. The second section provides a detailed description of the novel workflow process system and provides methods for operating embodiment of the invention. Finally, the third section provides a conclusion of the detailed description.

Hardware and Operating Environment

Figure 1:
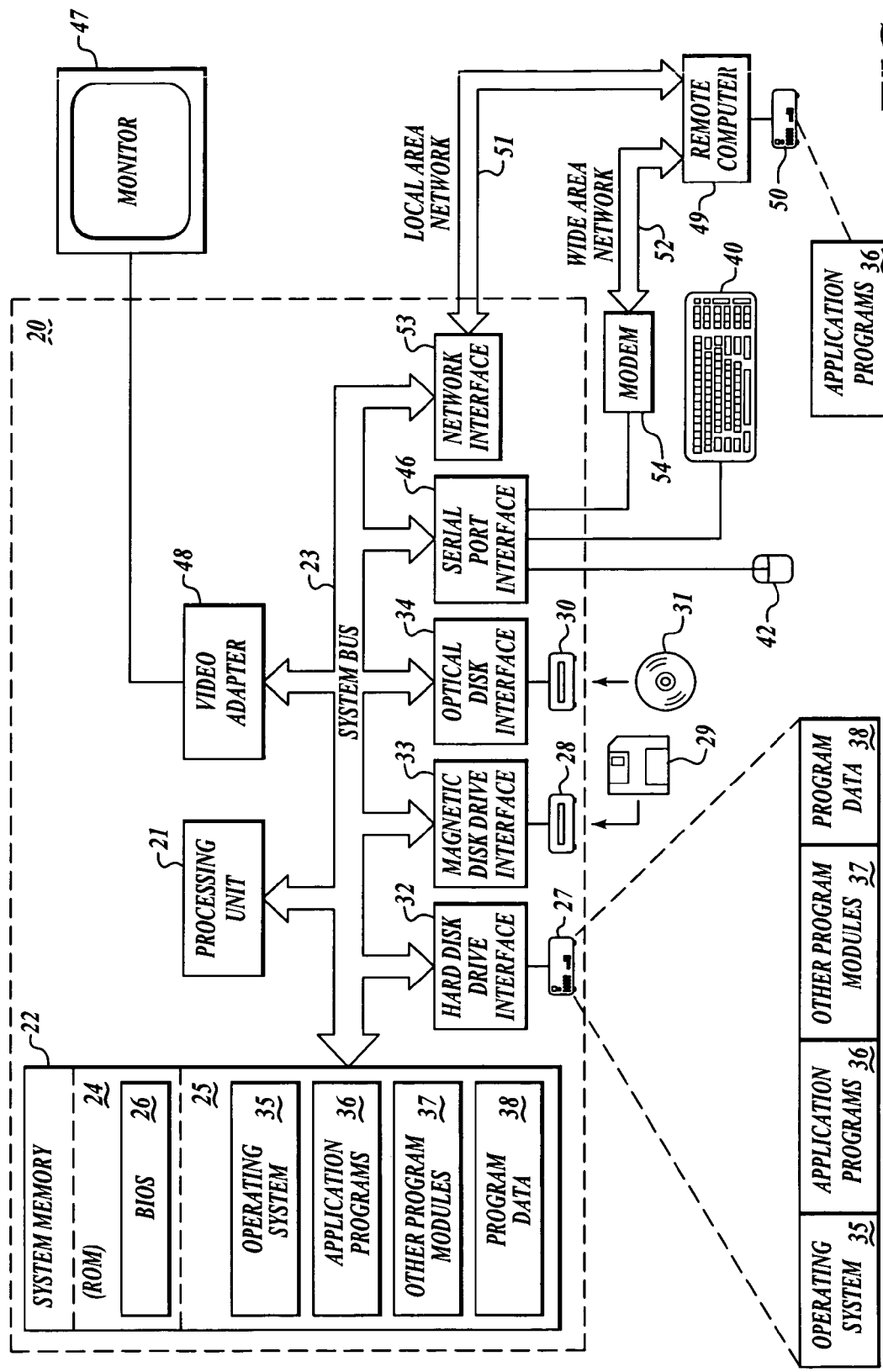
FIG. 1 is a block diagram of the hardware and operating environment of a suitable computer in conjunction with which embodiments of the invention may be practiced.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 shows a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 26 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computer-readable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. In addition to the monitor, personal computers typically include other peripheral output devices (not shown) such as speakers and printers. In one embodiment, one or more speakers 57 or other audio output transducers are driven by sound adapter 56 connected to system bus 23.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serial-port interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Operation Overview

This invention extends the search mechanism for locating solution access information associated with an executable file, beyond the traditional methods presented in the background. The present invention can be used cumulatively such that when one of the traditional search mechanisms fails, the system of the present invention is employed. In the present invention, information, or metadata, is extracted from an original file, e.g. a local executable file, is packaged into an HyperText Transfer Protocol (HTTP) request and sent to a server, e.g. locator server. The server uses the information sent to it to lookup the location of the desired solution access information and responds to a client with the information it has. The terms "client" and "server" are not meant to imply any particular hardware configuration for the system, a client and a server may execute as a system on a single CPU architecture or a multiple CPU architecture. Alternatively the client and server functions can be distributed among several systems communicatively couple together.

The server can respond with the location of the solution access information or could return the information directly. In the case where the server responds with an HTTP redirect and the location given is a file; the uniform resource locator (URL) operation maps similar to the behavior for the traditional search mechanisms. That is, the file location can be treated just as if it was found during the local search process. For other forms of redirection or where the solution access information file is returned by the server, the file can be saved to a local file path and then treated like the traditional search mechanisms above, or the solution access information can be read directly by a client from the server.

Using an HTTP server for lookup is not limited to a single server. As with the local, traditional search mechanisms, a list of servers can be configured and each tried in turn or in parallel. Also, as with the local, traditional search mechanisms, the HTTP server path needs to be known in order to make the HTTP request. The HTTP server path can be hard coded in the search logic or found by querying environment variables, registry locations, or other local configuration information. According to the teachings of the present invention, there are several ways in which the location of the HTTP servers can be found. These approaches are as follows. The servers could be queried from a Dynamic Host Configuration Protocol (DHCP) server that resides on the network containing the client system. The HTTP request to the DHCP finds the Uniform Resource Indexes (URIs) necessary to query the appropriate server containing the information associated with an executable. A Domain Name Search (DNS) server could be queried for a service (SRV) record identifying the appropriate server containing the information associated with an executable. A directory service such as the Windows 2000 Active Directory could be queried to return the appropriate server containing the information associated with an executable. Also, according to the teachings of the present invention, other types of servers including but not limited to Application Configuration Access Protocol (ACAP) servers, and/or Lightweight Directory Access Protocol (LDAP) servers can be used. Accordingly, querying the look-up servers for the location of the appropriate server containing the information associated with an executable, includes using these additional protocols for LDAP and ACAP network database queries.

In one embodiment according to the teachings of the present invention, the implementation of a symbol server works as follows. A feature set is provided that enables debuggers to automatically retrieve the correct symbol file with no prior information about product name and release or build number. In this embodiment of the invention, a package is provided which contains a tool to build a repository of symbols. Using symbol server technology, the debuggers can locate symbol files automatically, finding each file according to a set of unique parameters that are independent of the product name and release or build number. This system can be used to debug any product that uses symbolic information as generated by the VC compilers, regardless of it's source.

According to the teachings of the present invention, the server DLL is the code that should communicate with dbghelp to find the correct symbols. When the debugger or similar tool needs to analyze a program module, it gets these symbols by loading one or two files that contain the symbols for the module. The module may be a disk-based file or memory-image of the file. Since the module could be one of many different versions of the same module, the technology needs a mechanism to quickly find the correct program module. Every time dbghelp tries to load symbols for a newly loaded module, it will call the symbol server DLL with a certain set of variables to help the server to find the appropriate files. The module contains a header that, in turn, contains information that helps to run the module. According to the present invention, some of this information is used to create a unique identifier for the module that won't be replicated between differing versions of the module. Different values from the image header will be used depending upon the type of symbolic information file which is being searched.

The symbol server is engaged by adding an entry to the value in the _NT_SYMBOL_PATH or _NT_ALTERNATE_SYMBOL_PATH environment variables. The value is added between semicolons just as any other path might be added, or conversely it could take up the entire variable, if it is wished that only the server be used for the location of symbols. Furthermore, multiple entries can be added that indicate the server look in multiple locations. These entries can be placed in any order within the symbol path, allowing the debugger to first look in some path location, and then check a symbol server, or whatever order is desired. The syntax for server entry in these variables is as follows.

SYMSRV*FOO.DLL*DATA. Two asterisks are used to parse the parameters. Trailing asterisks are ignored and passed to the server DLL as part of the last node. SYSMSRV is a literal test string that indicates to dbghelp to call a symbol server. FOO.DLL is the name of the server DLL to load. DATA is server-specific information that tells the server where or how to look for symbols. It will be passed to the DLL when called. The symbol server can be installed through an installation that copies the required DLL, sets the environment values, and whatever else it requires, or it might be installed by the user from instructions in a text file.

If dbghelp is looking for a DBG file, a first variable, or parameter, will contain the TimeDateStamp of the original image as found in its PE header. A second variable, or parameter, will contain the SizeOfImage field, also extracted from the PE header. A third variable, or parameter, is unused and will be zero.

If dbghelp is looking for a PDB file, a first parameter will contain the PDB signature as found in the codeview debug directory of the original image. A second parameter will contain the PDB age. And, a third will contain zero. For example, if searching for a .pdb file, the Signature and Age values are extracted from the module header and appended into a single numeric value, e.g. if the signature is 4747474747 and the age is 1, the numeric value is 47474747471. A unique file path is then created consisting of the name of the symbol file and the numeric value. The server technology has already stored this file in the file path that matches this text, so it simply returns to the debugger the created file path with the root of the symbol store data pre-pended. The file will be in said location, e.g. <\\SymSrv\Root\filename.pdb\47474747471\filename.pdb>. What is nice about this method is that there is no need to search every version of the symbol file in question to find the matching one. This is because the corresponding image contains the information to re-create the file path to the symbol file. Therefore, the file is found and opened with a single call to the file system.

Analogously, if dbghelp is looking for any other type of image, such as an actual executable file, it is probably being called through it's FindFileInSearchPath( ) API. In this case, the parameters are opaque to dbghelp. However, if this API is being used to retrieve an executable file, it is expected that the parameters will be filled in as for a DBG file, using timedatestamp and size of image as parameters.

If the server locates a valid symbol file, it is returned TRUE, otherwise it is to return FALSE and set the LastError value to indicate why the symbol file was not returned. This same path creation mechanism is also used for ftp, http, and https based symbol stores. The only difference is that the root of the path is used as the internet entity to open and the rest of the generated path is passed in.

One of ordinary skill in the art will further understand upon reading this disclosure, that the same inventive implementation methodology is equally applicable in handling minidumps. A minidump is a file that contains enough information to re-create the memory state of a machine at the time the minidump snapshot was taken. Instead of storing the complete module images as they exist in the machine being snapshot, just enough information is stored about each module to call up a copy of the original image from a symbol store, using the symbol server technology. However, it should be apparent that once the copy of the image is loaded from the symbol store, its novel header can be read as above to obtain the values for loading the symbol files.

Another embodiment of the present invention extends what has been described above. In this embodiment of the present invention, most of the "smarts" are placed on a novel symbol location server. In this embodiment, a user can send a query to the server containing metadata on what the user is trying to locate. In this embodiment, there is no limit to the amount of information that can be submitted with the query. The user is not required to know a specific subset of information such as signature and age. This embodiment does not require a known set of environment variables. Moreover, other information can similarly be used to qualify the information being searched. For example, various queries can be constructed to tell the server to look for a particular signature but ignore a certain path or ignore a particular time stamp. Analogously, the query can instruct the server to look for a particular time stamp but ignore a certain signature. One benefit of this approach is signatures may not be unique on any given day and likewise there are some instances in which a time stamp in an executable must change. Thus, in this embodiment, the user is given the ability to custom tailor a query and then allow the novel symbol server to apply its logic to determine exactly which unique file is being requested.

Figure 2:
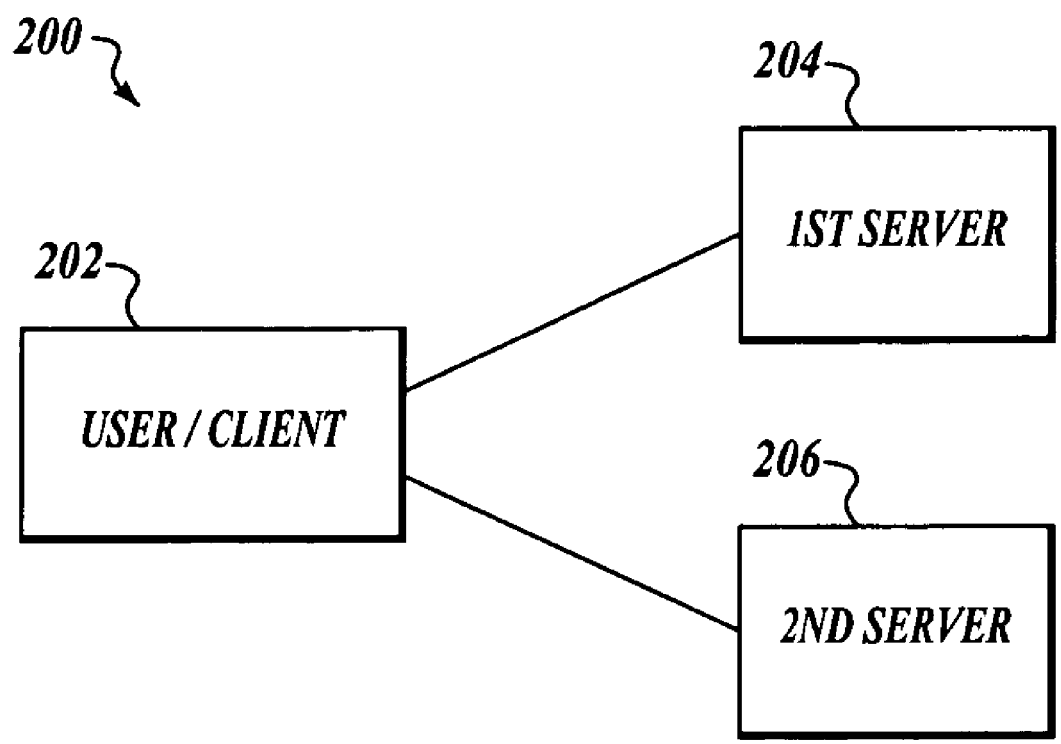
FIG. 2 is a block diagram of a computerized system according to the teachings of the present invention.

FIG. 2 illustrates the novel computerized system 200, or server architecture, for locating information relating to an executable. As shown in FIG. 2, the system 200 includes a client, computer, or user 202 which is couple to a first server 204 and a second server 206. As explained above, the terms "client" and "server" are not meant to imply any particular hardware configuration for the system, a client and a server may execute as a system on a single CPU architecture or a multiple CPU architecture. Alternatively the client and server functions can be distributed among several systems communicatively couple together. Also, as one of ordinary skill in the art will understand upon reading this disclosure, the first server 204 may be part of a larger cluster, or first set of servers 204. Likewise, the second server may be part of a larger cluster, or second set of servers 206.

The first server 204 includes the novel symbol location server according to the teachings of the present invention. This symbol location server 204 contains location information for information associated with a local file. According to the teachings of the present invention, this location information on the first server 204 can be accessed according to the methods presented and described in more detail above. The second server 206 can contain the information which is sought after associated with the local file. Computer 202 has a number of local files resident on its system memory. By way of illustration, and not by way of limitation, the local file is defined to include an executable file. Also then by way of illustration, and not by way of limitation, the information associated with the local file, or executable, is defined to include a debug (.dbg) file and a program database (.pdb) file. The same is further defined to include another executable (.exe) file related to the local executable file. The information is further defined to include regression analysis data, performance analysis data, and source code data all associated with the local executable file, the same is not so limited. When the debugger dbghelp or similar tool needs to analyze a module, it gets these symbols by loading one or more files that contain the symbols for the module. As described above, the module contains a header which can contains a unique identifier for the module that won't be replicated between differing versions of the module. According to the teachings of the present invention, different values from the image header can be used to query the first server 204. Alternatively, the user can create a custom tailored query and submit the same to the first server 204. The location information contained on the first server 204 is the location information for the second server 206. In this embodiment the second server contains the information being sought. The first server 204 provides a set of information on the second server 206 to the client 202, or computer 202. In one embodiment, the location information and the information itself are on the same server, e.g. first server 204.

In the first embodiment of the present invention, the set of information provided to the computer 202 by the first server 204 includes the location information for the second server 206. The location information can be used by the computer 202 to query the second server 206 for the information associated with the local file, e.g. executable file. In the second embodiment, the set of information provided to the computer 202 by the first server 204 includes the actual information associated with the local file. In still an alternative embodiment, the first server 204 locates the information associated with the local file and provides it directly from the second server 206 to the computer 202. The computer 202 can read the information associated with the local file directly from the second server 206 or the computer 202 can receive the information associated with the local file as a set of files containing the information associated with the executable which can be stored in a system memory, as the same are know and understood from FIG. 1.

According to the teachings of the present invention, the first server 204 is a locator server 204. The first server 204 of the present invention, includes a first server 204 selected from the group consisting of an HTTP server, e.g. a DHCP server or DNS server, an ACAP server, and a LDAP server. In the embodiment in which the first server 204 is part of a larger cluster or first set of servers, the computer 202 can be configured to query a number of different tiers or multiple levels in a hierarchy of first servers 204 in a defined serial order. In another variant of this embodiment, the computer can be configured to query the number of different tiers or multiple levels of a first set of servers 204 in parallel.

Figure 3:
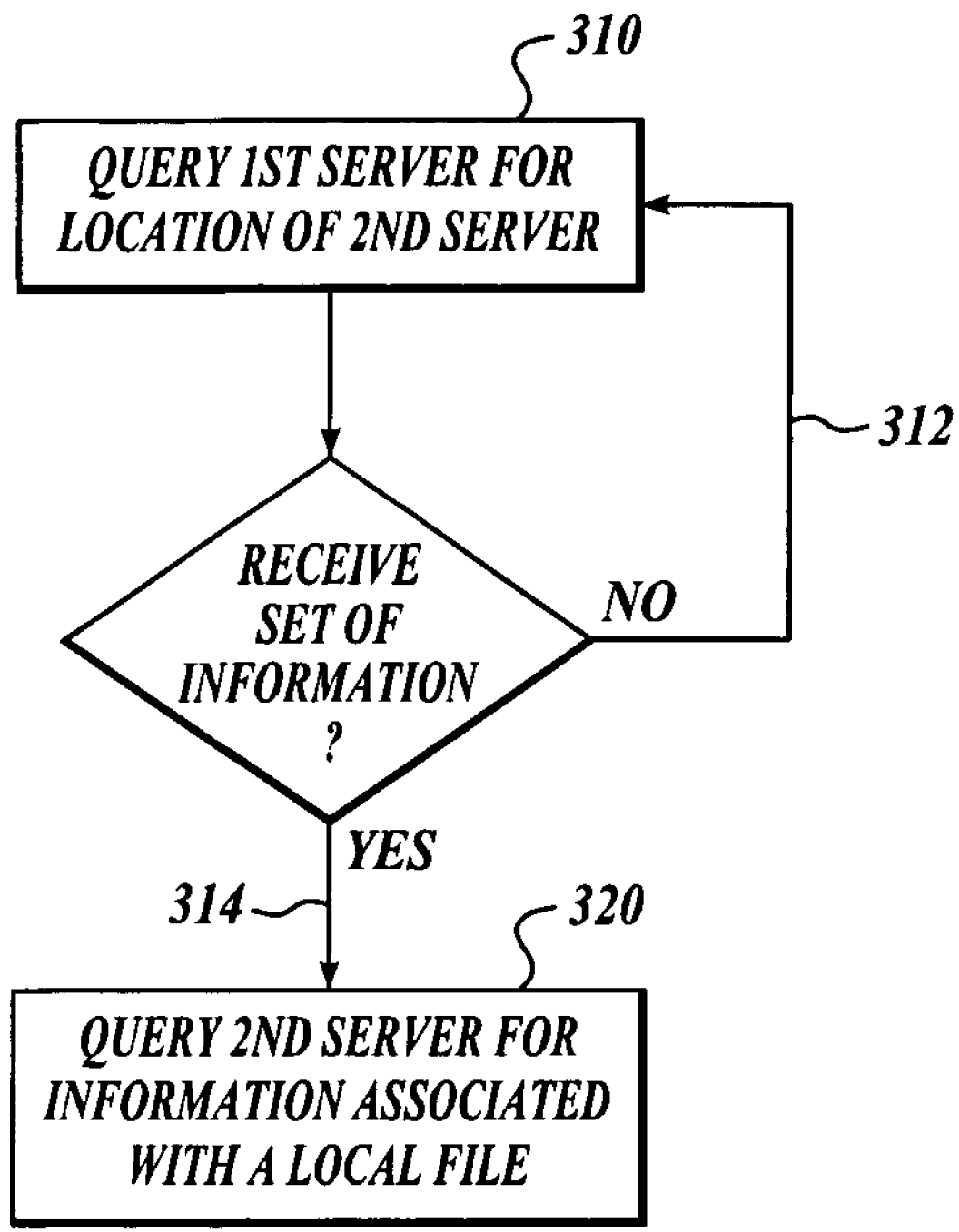
FIG. 3 illustrates, in flow diagram form, a method embodiment according to the teachings of the present invention.

FIG. 3 illustrates, in flow diagram form, a computer implemented method according to the teachings of the present invention. This computer implemented method provides an illustration of the operation of the present invention using the novel system of FIG. 2. The computer implemented method includes a method of locating information associated with an executable file. In FIG. 3, a first server is queried for the location of information associated with a local file. In one embodiment, the first server is queried for the location of a second server containing information associated with a local file, e.g. an executable file at 310. In one embodiment, the first server is queried by the client as discussed in connection with FIG. 2. If the query to the first server does not result in the client receiving a set of information, then at 312 the flow chart returns to block 310 and a new query can be posed to the first server. The process can be repeated here until the client receives back from the first server the sought after information, or alternatively, a set of information regarding the location of a second server which does have the information. Again, as explained in detail in connection with FIG. 2, the system can be configured to query a number of different levels or multiple tiers in a hierarchy of a first set of servers. If, however, the query to the first server does result in the client receiving a set of information, e.g. reference locations or location information for the second server, then at 314 the flow chart proceeds to block 320. At block 320 the second server is queried for the information associated with the executable file using an appropriate syntax based on the location information received for the second server. According to the teachings of the present invention, querying a first server for a location of a second server includes providing a path to a lookup HTTP server as described above. As one of ordinary skill in the art will understand upon reading this disclosure, providing a path to a lookup HTTP server includes querying a DHCP server and requesting a number of URIs. The URIs are then used to compose an appropriate query to the second server. Querying the first server can also include querying a DNS server, and an ACAP or LDAP server using LDAP and ACAP database network queries, the invention is not so limited.

Figure 4:
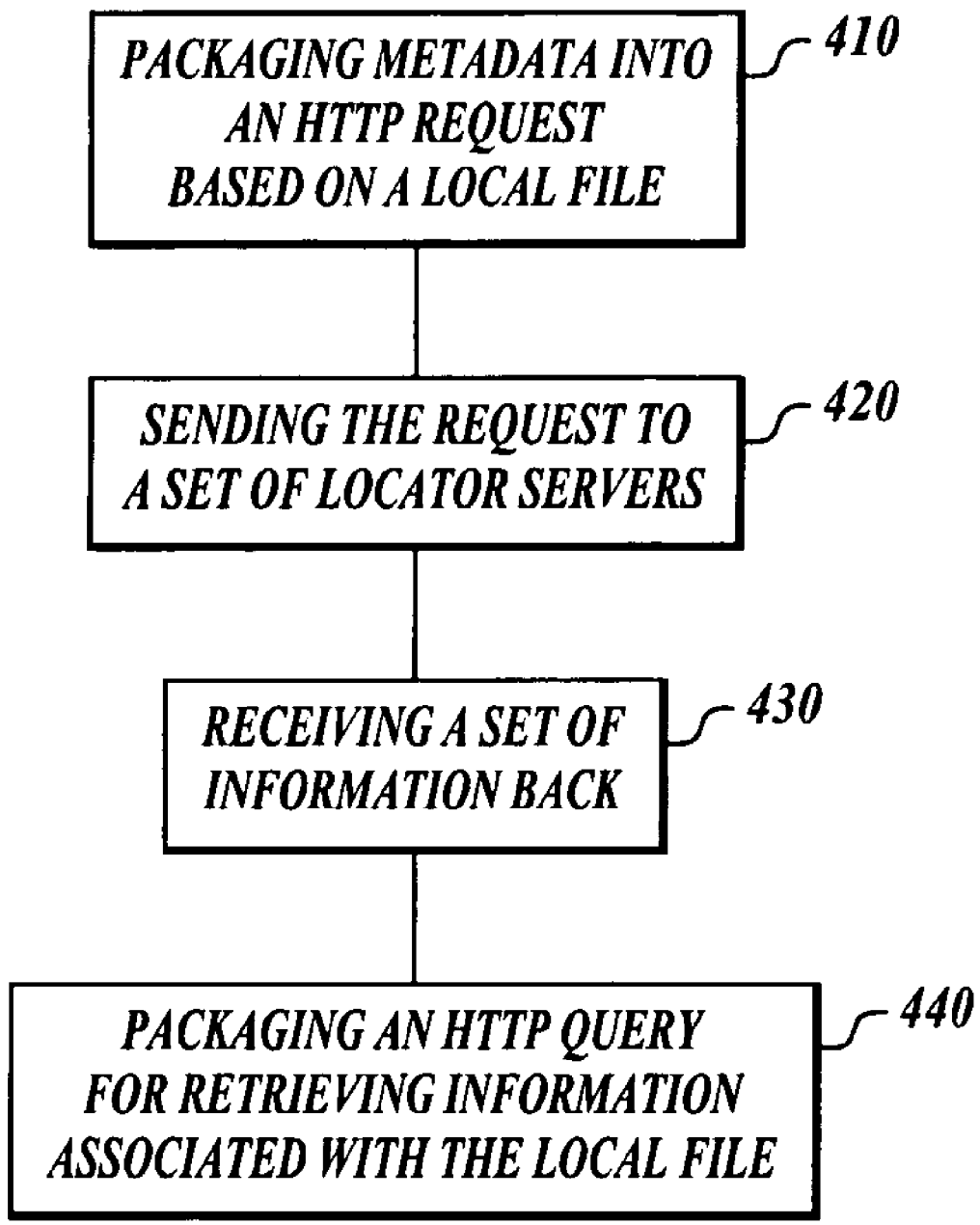
FIG. 4 illustrates, in flow diagram form, another method embodiment according to the teachings of the present invention.

FIG. 4, illustrates, in flow diagram form, a computerized method for locating information associated with a local file according to the teachings of the present invention. As shown in FIG. 4, the method includes packaging metadata extracted from the local file into an HTTP request at 410. One of ordinary skill in the art will understand upon reading this disclosure the manner in which the metadata can be packaged into an HTTP request. As used in this application, by way of illustration, and not by way of limitation, metadata is defined to include any form of data identifier, such as a base name for a local file, a signature stamp, a time stamp, an age, etc., the same is not so limited. Thus, in one embodiment, as described above, a number of different values from an image header are extracted and packaged into the HTTP request. Additional examples of packaging metadata extracted from a local file into an HTTP request includes custom tailoring a query to extract over whatever is present in a back end store. That is, metadata can be packaged into a query which specifies a request to locate an updated version of the local file, a request for locating a debug file associated with the local file, or even a request to locate a specific build version of the executable file. The packaged query can instruct the server to ignore or specifically search for a timedatestamp and/or signature. The invention is not so limited.

The HTTP request is then sent to a set of locator servers, or first set of servers containing location information for information associated with the local file at 420. As will be understood by one of ordinary skill in the art, the first set of servers will include means for interpreting metadata associated with an executable file received from a remote client. That is the first set of servers include logic circuitry adapted to interpreting the metadata. The first set of servers can then provide a set of information back to the client in the form of either an HTTP redirect, or can connect the client directly to a server having the information associated with the local file. In either case, the method includes receiving a set of information back from the set of locator servers at 430.

Where the client is not directly connected to the sought after information, the set of location information is used to query an appropriate server having the information. In this case, at 440, the method includes packaging an HTTP query for retrieving the information associated with the local file based on the set of information received back from the set of local servers. As explained earlier, a substitute query format other than HTTP can be used depending on the set of information received back from the set of local servers. That is, if the set of information received back from the set of locator servers indicates that the information associated with the local file is on an LDAP or ACAP server, then the appropriate protocol for an LDAP or ACAP database query will be used. Whatever appropriate protocol is used, the method of packaging the query for retrieving information associated with the local file includes qualifying the query to select a specific file version from among the information associated with the local file. According to the present invention, the precision of querying the appropriate information is increased. Also, in one embodiment of the present invention, the breadth of qualifying the query is increased due to the larger query format being employed. Thus, the query can include a wide range of information including path information, build date, version information, age, signatures, and time stamps, the same is not so limited. In one embodiment, some of the information in the query will be in the form of a number of unique identifiers obtained from the header of a local file. In other embodiments, the information in the query will consist of a user customized query to pinpoint specific qualifiers and/or restrictions for locating the information associated with the local file. Again, by way of illustration and not by way of limitation, a qualifier to the query can instruct the second server to ignore a particular piece of the query if it finds a conflict, or to ignore a certain type of file altogether, e.g. ignore .pdb files. As was the case for the set of locator servers, the second server, or set of servers is adapted to interpreting a query from a remote client for retrieving a specific file from among the information associated with the local file. That is, the second server includes logic circuitry which the second server applies to the query to determine exactly which unique file it is that the client is requesting.

CONCLUSION

Systems and methods have been described which extend the mechanism for locating solution access information and then obtaining and implementing the correct solution for updating software programs while in the development stage or in supporting programs in the field. According to the teachings of the present invention, a user can communicate with a symbol location server, tell it what the user is interested in, and then the symbol location server replies with either the desired information or location information on where to locate the desired information. Thus, the user no longer has to register, e.g. in the environment variables, the individual paths for where a multitude of different applications find their additional related information on the network. According to the teachings of the present invention, a user will have to make basically zero changes to the system, and instead will automatically discover the name location of a server that is going to provide the user with the information associated with any user executable file.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, is manifestly intended that this invention be limited only by the following claims and equivalents thereof.

We claim:

1. A computer-readable medium having computer-executable instructions comprising:
    assigning a value to a unique identifier that is used to identify a version of software associated with an executable, wherein:
        the value is associated with a feature of update information that is used to update the corresponding version of the software, and
        the feature comprises at least one of: the location of the update information, a method for locating the update information, a time stamp associated with the update information, the size of the update information, a signature associated with the update information, and the age of the update information;
    extracting metadata from the executable, wherein the metadata includes the unique identifier;
    generating a request to obtain location information of the update information using the unique identifier, wherein the request is generated by packaging the extracted metadata;
    querying a first server for the location information using the request, wherein:
        the location information includes a redirect to a location of a second server that comprises the update information,
        the redirect includes the unique identifier, and
        the location information identifies the second server type;
    linking the first server to the second server;
    querying the second server for the update information using the redirect, wherein the redirect is associated with a protocol supported by the second server type identified in the location information;
    receiving the update information from the second server; and
    updating the version of the software identified by the unique identifier based on the update information.

2. The computer-readable medium of claim 1, wherein querying a first server further comprises providing a path to a look up HyperText Transfer Protocol (HTTP) symbol location server.

3. The computer-readable medium of claim 1, wherein querying a first server further comprises querying a Dynamic Host Configuration Protocol (DHCP) server and requesting Uniform Resource Identifiers (URIs) to query the second server for the update information.

4. The computer-readable medium of claim 1, wherein querying a first server further comprises querying a Domain Name System (DNS) server for a service (SRV) record identifying the second server to be queried.

5. The computer-readable medium of claim 1, wherein querying a first server further comprises querying a directory service for the location information.

6. The computer-readable medium of claim 1, wherein querying a first server further comprises querying an Application Configuration Access Protocol (ACAP) server for the location information.

7. The computer-readable medium of claim 1, wherein querying a first server further comprises querying a Lightweight Directory Access Protocol (LDAP) server for the location information.

8. The computer-readable medium of claim 1, wherein the metadata comprises metadata for debug files.

9. The computer-readable medium of claim 1, wherein the metadata comprises metadata for source files.

10. The computer-readable medium of claim 1, wherein querying the second server further comprises querying the second server for symbols associated with the executable.

11. The computer-readable medium of claim 1, wherein querying the second server further comprises querying the second server for regression analysis data associated with the executable.

12. The computer-readable medium of claim 1, wherein querying the second server further comprises querying the second server for performance analysis data associated with the executable.

13. The computer-readable medium of claim 1, wherein querying the second server further comprises querying the second server for source code associated with the executable.

14. The computer-readable medium of claim 1, wherein receiving the update information further comprises receiving files comprising the update information.

15. The computer-readable medium of claim 1, wherein generating the request further comprises packaging the extracted metadata to locate an updated version of the executable.

16. The computer-readable medium of claim 1, wherein generating the request further comprises packaging the extracted metadata for locating a debug file associated with the executable.

17. The computer-readable medium of claim 1, wherein generating the request further comprises packaging the extracted metadata to locate a specific build version of the executable.

18. The computer-readable medium of claim 1, wherein querying the second server further comprises providing a qualifier.

19. The computer-readable medium of claim 1, further comprising providing a response to a requesting client from the first server, wherein the response comprises the redirect.

20. A computer-readable medium having computer-executable instructions comprising:
assigning a value to a unique identifier that is used to identify a version of software associated with an executable, wherein:
the value is associated with a feature of update information that is used to update the corresponding version of the software, and
the feature comprises at least one of: the location of the update information, a method for locating the update information, a time stamp associated with the update information, the size of the update information, a signature associated with the update information, and the age of the update information;
extracting metadata from the executable, wherein the metadata includes the unique identifier;
generating a request to obtain from a first server location information associated with a second server, wherein:
the request is generated by packaging the extracted metadata,
the second server comprises the update information,
the location information includes a redirect to a location of the second server,
the redirect includes the unique identifier, and
the location information identifies the second server type;
creating a path to the second server;
querying the second server using the redirect, wherein the redirect is associated with a protocol supported by the second server type identified in the location information;
receiving the update information from the second server through the path; and
updating the version of the software identified by the unique identifier based on the update information.

21. The computer-readable medium of claim 20, wherein receiving the update information further comprises receiving a reference location associated with the second server to access a file associated with the executable on the second server.

22. The computer-readable medium of claim 20, wherein querying the second server further comprises querying a server selected from a group consisting of a DHCP server, a DNS server, an ACAP server, and a LDAP server.

23. The computer-readable medium of claim 22, wherein querying the second server further comprises querying a set of servers in parallel.

24. The computer-readable medium of claim 22, wherein querying the second server further comprises querying a set of servers in a serial order.

25. The computer-readable medium of claim 20, wherein querying the second server further comprises packaging information extracted from the executable into a request and sending the request to the second server.

26. A computerized system comprising:
a first server comprising location information for update information that is used to update a corresponding version of software associated with a local file, wherein:
the version of the software is identified by a unique identifier that has an assigned value associated with a feature of the update information,
the feature comprises at least one of: the location of the update information, a method for locating the update information, a time stamp associated with the update information, the size of the update information, a signature associated with the update information, and the age of the update information,
the first server extracts metadata from the local file
the metadata includes the unique identifier,
the first server generates a request by packaging the extracted metadata, and
the location information identifies the type of server that comprises the update information;
a second server comprising the update information, wherein:
the first server is linked to the second server through a redirect that is included in the location information,
the first server queries the second server through the redirect for the update information, wherein the redirect is associated with a protocol supported by the second server type identified in the location information, and
the first server receives the update information from the second server; and
a computer comprising the local file, wherein the first server provides the update information to the computer such that the version of the software identified by the unique identifier is updated based on the update information.

27. The system of claim 26, wherein the update information comprises debug information.

28. The system of claim 26, wherein the update information comprises solution access information.

29. The system of claim 26, wherein the computer reads the update information from the second server.

30. The system of claim 26, wherein the first server comprises a HyperText Transfer Protocol (HTTP) server.

31. The system of claim 30, wherein the HTTP server comprises a Dynamic Host Configuration Protocol (DHCP) server having Uniform Resource Identifiers (URIs) for querying the second server.

32. The system of claim 30, wherein the HTTP server comprises a Domain Name System (DNS) server having a service (SRV) record for identifying the second server.

33. The system of claim 30, wherein the HTTP server comprises a directory service for providing the location information for the update information to the computer.

34. The system of claim 26, wherein the first server comprises an Application Configuration Access Protocol (ACAP) server.

35. The system of claim 26, wherein the first server comprises a Lightweight Directory Access Protocol (LDAP) server.

36. The system of claim 26, wherein the computer is networked to the first and the second servers over the Internet.

37. The System of claim 26, wherein the computer is configured to query a hierarchy of first servers in serial order.

38. The system of claim 26, wherein the computer is configured to query a hierarchy of first servers in parallel.

39. The system of claim 26, wherein the update information comprises solution access information.

40. The system of claim 26, wherein the computer is configured to query the second server, in an HTTP request format, for the update information using a qualifier associated with the local file.

41. The system of claim 26, wherein the metadata comprises metadata for a debug file associated with the local file.

42. The system of claim 26, wherein the metadata comprises metadata associated with regression analysis data for the local file.

43. A method for updating software associated with a local file, comprising:
assigning a value to a unique identifier that is used to identify a version of software associated with the local file, wherein:
the value is associated with a feature of update information that is used to update the corresponding version of the software, and
the feature comprises at least one of: the location of the update information, a method for locating the update information, a time stamp associated with the update information, the size of the update information, a signature associated with the update information, and the age of the update information;
extracting metadata from the local file, wherein the metadata includes the unique identifier;
packaging the extracted metadata into a request to obtain the update information, wherein the metadata is associated with the unique identifier;
sending the request to a locator server;
receiving location information from the locator server, wherein:
the location information includes a redirect to a location of a second server that comprises the update information,
the redirect includes the unique identifier, and
the location information identifies the second server type;
packaging a query for retrieving the update information based on the redirect, wherein the query corresponds to a protocol supported by the second server type identified in the location information; and
updating the version of the software identified by the unique identifier based on the update information.

44. The method of claim 43, wherein packaging the query further comprises qualifying the query to select a specific file version from the update information.

45. The method of claim 44, wherein qualifying the query further comprises qualifying the query to select an updated file version associated with the local file.

46. The method of claim 44, wherein qualifying the query further comprises qualifying the query to select a specific debug file associated with the local file.

47. A server architecture comprising;
a first server comprising location information for update information that is used to update a corresponding version of software associated with an executable file, wherein:
the version of the software is identified by a unique identifier that has an assigned value associated with a feature of the update information,
the feature comprises at least one of: the location of the update information, a method for locating the update information, a time stamp associated with the update information, the size of the update information, a signature associated with the update information, and the age of the update information,
the first server extracts metadata from the local file
the metadata includes the unique identifier,
the first server generates a request by packaging the extracted metadata, and
the location information identifies the type of server that comprises the update information;
a second server linked to the first server based on the request, wherein the second server comprises the update information associated with the executable file;
means for interpreting the metadata associated with the unique identifier received by the first server from a remote client;
means for generating a query for retrieving the update information using a redirect identified in the location information, wherein:
the redirect includes the unique identifier, and
the redirect is associated with a protocol supported by the second server type identified in the location information;
means for redirecting the remote client to the second server using the redirect, wherein the second server is adapted to interpret the query from the remote client; and
means for updating the version of the software identified by the unique identifier based on the update information.

* * * * *